Sept. 28, 1965  W. H. DOHERTY  3,208,335
PHOTOGRAPHIC APPARATUS
Filed Feb. 27, 1963  5 Sheets-Sheet 2

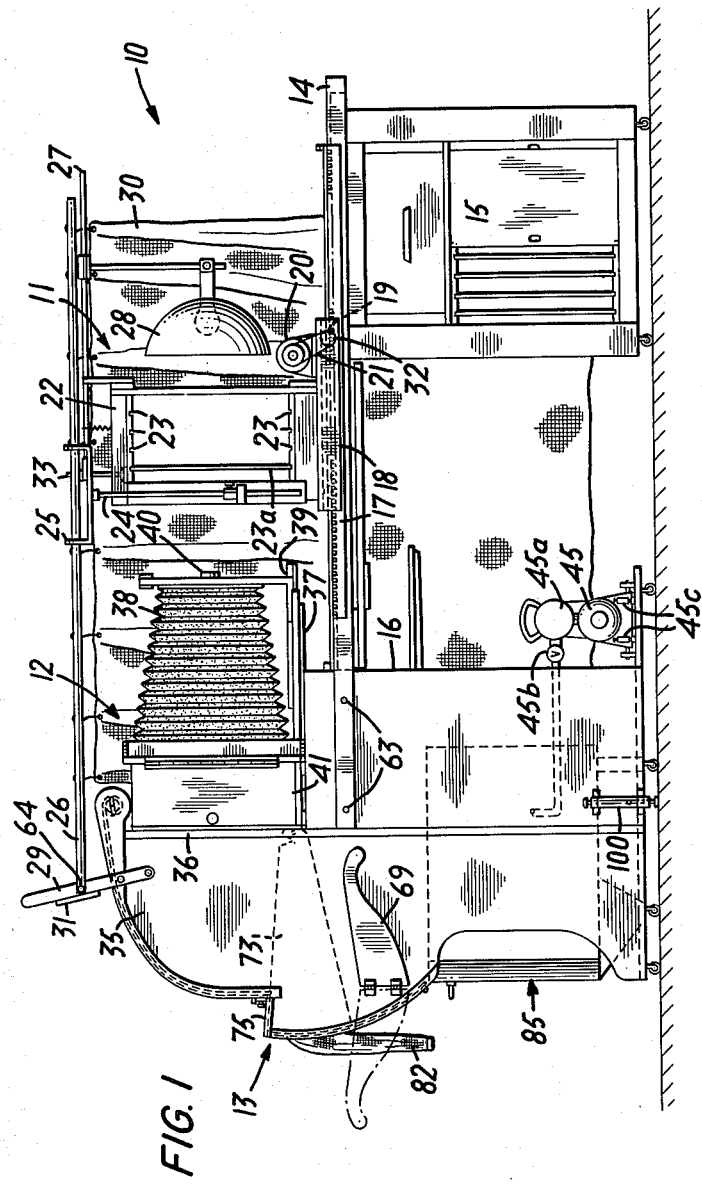

INVENTOR.
WILLIAM H. DOHERTY his ATTORNEYS

Sept. 28, 1965 W. H. DOHERTY 3,208,335
PHOTOGRAPHIC APPARATUS
Filed Feb. 27, 1963 5 Sheets-Sheet 3

INVENTOR.
WILLIAM H. DOHERTY
BY
his ATTORNEYS

Sept. 28, 1965 W. H. DOHERTY 3,208,335
PHOTOGRAPHIC APPARATUS
Filed Feb. 27, 1963 5 Sheets-Sheet 4

INVENTOR.
WILLIAM H. DOHERTY his ATTORNEYS

United States Patent Office 3,208,335
Patented Sept. 28, 1965

3,208,335
PHOTOGRAPHIC APPARATUS
William H. Doherty, 88—43 62nd Drive,
Rego Park, N.Y.
Filed Feb. 27, 1963, Ser. No. 261,273
5 Claims. (Cl. 88—24)

This invention relates in general to photographic apparatus and more particularly to a manually operated single photographic unit which can speedily reproduce and process photographs from real life scenes, prints or transparencies.

One of the difficulties with the present procedure and apparatus for enlarging, reducing and photographing various prints and the like resides in the space required to develop and print, and the need for removing the exposed negative or prints from the camera to another location. Certain fast film reproduction cameras have been developed recently but the photographic prints produced by these processes are limited in quality, size and number, in many cases producing only one print. Aside from these new aspects, however, the general photographic techniques have not changed substantially since their inital development. The invention disclosed herein is described in the terms of these original techniques but is readily adaptable for use with modern processing methods. In either case, however, when using original or improved techniques, this invention provides a means for reducing the wasted motion of the photographer and thus reducing the time of processing.

Generally the invention proposes the use of a light-tight chamber located immediately behind a camera, outside of which an operator may sit or stand while working within the chamber through a sense of touch.

The photographic apparatus consists in part of a lens positioned so as to focus images on light sensitive material held firmly in position on a holding plate behind the lens. Both the holding plate and the lens are positioned within the light-tight chamber in which the photographer positions light sensitive material, exposes it to the desired image and processes it in suitable baths by extending his arms into the chamber through flexible light-tight sleeves attached to the chamber walls. Only his hands, however, are actually within the chamber and are allowed to move to all points therein by the sleeves which fit closely about his wrists.

An adjustable port for access to the chamber is also provided whereby the photographer can focus the desired image passing through the lens onto a transparent plate. After the focusing operation is complete, the photographer merely closes the access port, slips into the light-tight working sleeves, fastens the light senstive material to the holding plate, and moves the holding plate into the specific position where it can receive a desired image. After the light sensitive material has been exposed it may be developed in the traditional manner by passing it through specific developing baths within the chamber.

One of the features of this invention includes the particular arrangement of a holding plate for positioning the light sensitive material. This holding plate has a plurality of apertures arranged to engage certain standard-size photographic sheets. The apertures are connected through tubing to a vacuum tank and pump which holds the light sensitive material firmly against the holding plate by suction.

Other features of this invention include an adjustable access port which allows complete freedom of movement within the development chamber, means for supplying the light-tight chamber without permitting the entrance of light rays, and means for automatically positioning prints or transparencies at specific distances in front of the lens.

Further features and a fuller understanding of this invention may be had by referring to the following description and claims taken in conjunction with the accompanying drawing in which:

FIGURE 1 shows a side elevational view of the entire photographic apparatus including the subject display section, the exposure section and the development section;

FIGURE 2 shows a plan view of the apparatus in FIGURE 1;

Figure 6:
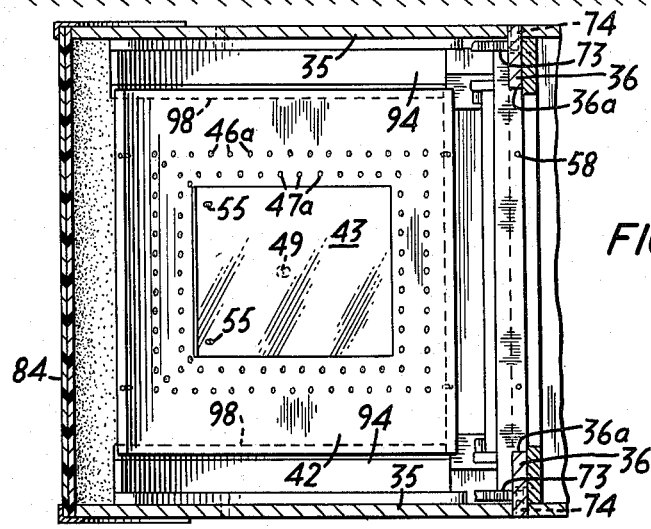
Figure 7:
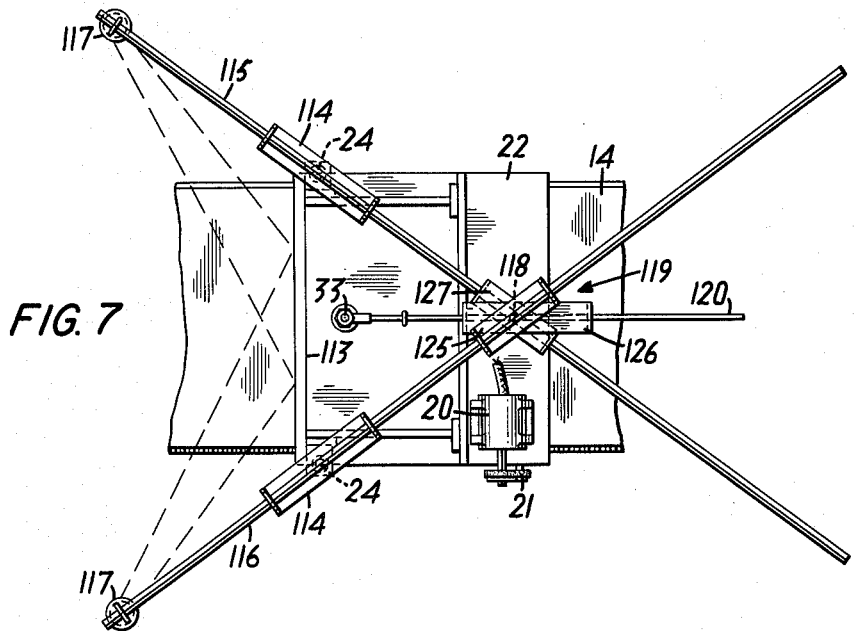
Figure 8:
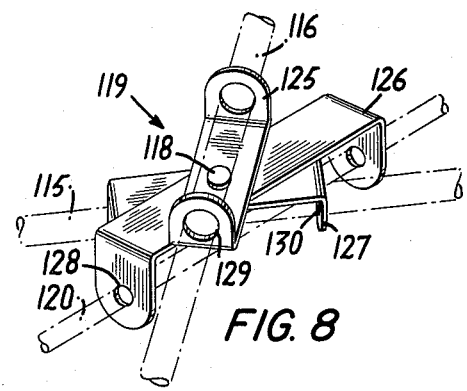
Figure 9:
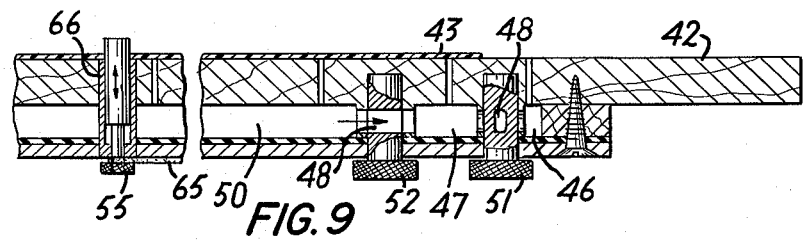

FIGURE 6 exhibits a plan view of the holding plate lying in the development chamber in its lower loading and unloading position;

FIGURE 7 illustrates a top view of an alternate embodiment of the display portion of this invention;

FIGURE 8 shows an isometric view of a trirod bracket used in this invention; and FIGURE 9 shows a partial plan view in cross-section of the holding plate portion of this invention.

With reference to the drawings the invention is illustrated as being incorporated generally in the photographic apparatus indicated by the reference character 10. As illustrated this apparatus can be categorized in three individual groups; the display section 11, the exposure section 12 and the development section 13.

The display section 11, as shown in FIG. 1, has been arranged so as to facilitate the reproduction of transparencies. As will be discussed below, other display arrangements suitable for reproducing photographic prints or the like may be used in combination in this invention. In this embodiment the display section 11 is supported on a generally horizontal table 14 which, in turn, is supported by a movable compartment 15 and the front wall 16 of the developement section 13. Two horizontal tracks 17, having grooves on their upper surface for receiving gear teeth, are disposed in parallel arrangement on opposite sides of the upper surface of table 14. Slides 18, having grooves on their lower inner surfaces for receiving gear teeth, are positioned horizontally above the tracks 17 and are moved slidably along these tracks by the gears 19 which are joined by shaft 32 and driven by electric motor 20 through the agency of belt 21.

A display container 22 is positioned above, and firmly attached to, the two slides 18 so as to be movable horizontally along the table 14. As shown in FIG. 1, the display box 22 has a plurality of grooves 23 which are designed to hold a transparency and any masking or screening pieces 23a which one may desire to place around the subject. Of course, in other arrangements, non-transparent positive photographs and masks may be placed in these grooves and the necessary lighting provided on the front surface of the photograph being copied.

The display container 22 is connected through vertical rods 24 and double brackets 25 to overhead rods 26. In addition to the support provided by the vertical rods 24, the overhead rods 26 are held in place by brackets 29 which are attached to side walls 35 of the enclosed developing chamber. Each overhead rod 26 also supports a shielding cloth or other material 30 along each side of the display container 22. In this manner light rays from uncontrolled external sources will be excluded from the display section 11 and the sharpness of reproduction increased.

Attached to the upper surface of the display container 22 is a horizontal lamp support rod 27. In the embodiment shown in FIGS. 1 and 2, a lamp 28 is suspended from the rod 27 in position directly behind the display container and the transparency contained therein. Since the lamp 28 is firmly attached to the display container 22, it will move horizontally with the container along the table 14 during the focusing operation, thereby illuminating the transparency with a light of generally constant intensity.

The exposure section 12 includes a conventional photographic lens 40 mounted slidably on platforms 37 and 39 and positioned in the front portion of a collapsible light-tight chamber 38 which is designed to convey an image from the lens to light sensitive material placed against the chamber's rear wall. A conventional shutter arrangement shields the lens 40 from light between exposures. The rear portion 41 of chamber 38 is provided with a plurality of grooves 41a (FIG. 3) for receiving masks or screening 34 which may be desired to soften the print or to achieve some other effect.

The present invention thus provides the photographer with two variables to assist in properly focusing the desired image. Not only may the distance between the lens and the light sensitive material be varied by adjusting the slide platforms 37 and 39, but, as discussed above, the distance between the lens and the transparency or photographic print being reproduced may be automatically varied by energizing electric motor 20.

Figure 3:
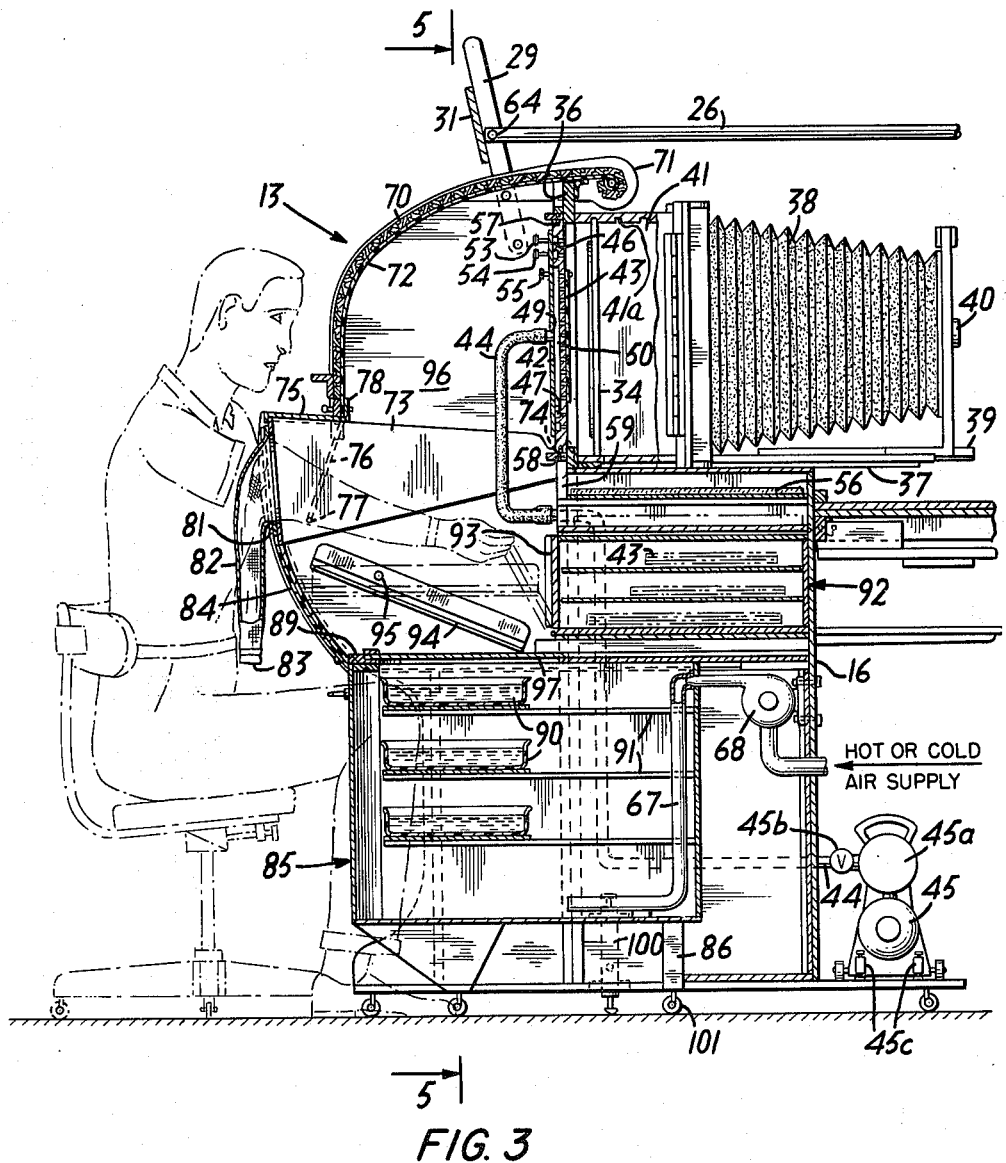
FIGURE 3 illustrates a cross-sectional side elevation of the exposure section and the development section of the invention with the photographer working in a seated position.
Figure 4:
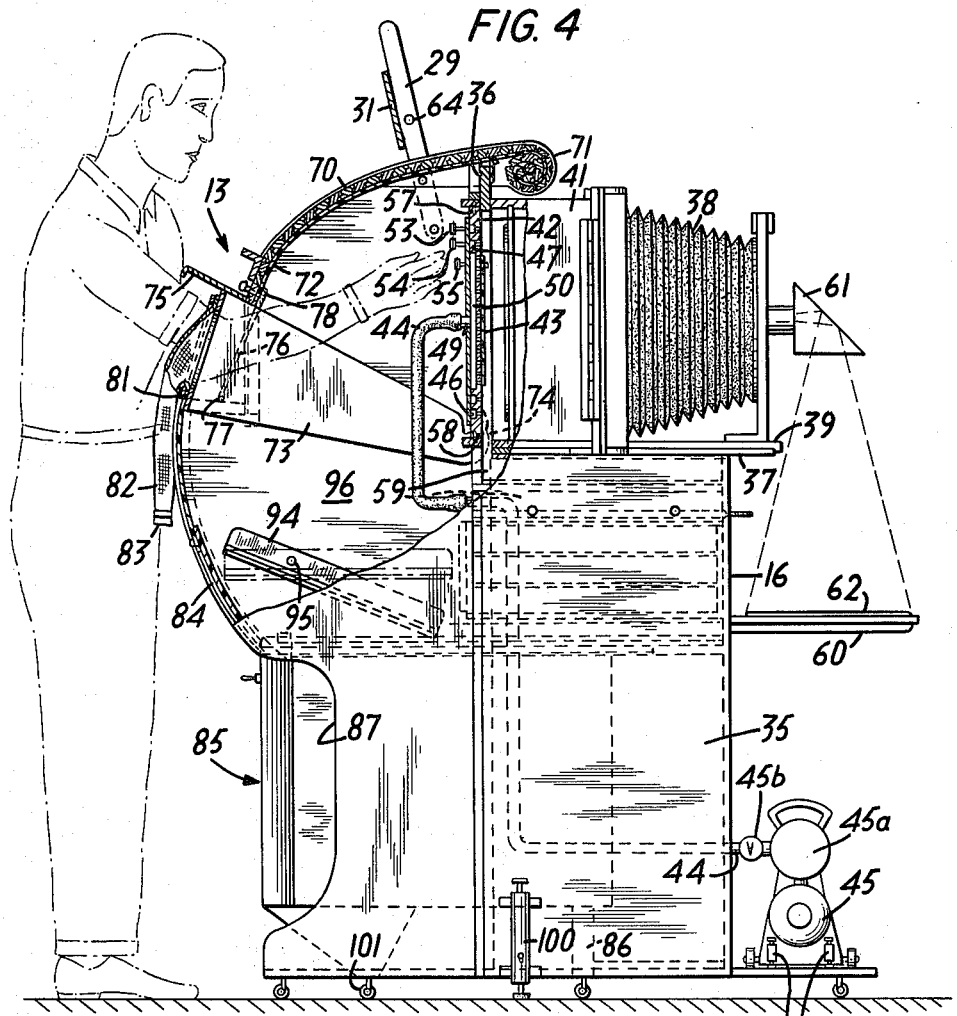
FIGURE 4 shows a partially cross-sectioned side elevation of the exposure and development sections of the invention with the photographer working in a standing position and with a two-dimensional subject being exposed in a horizontal position.
Figure 5:
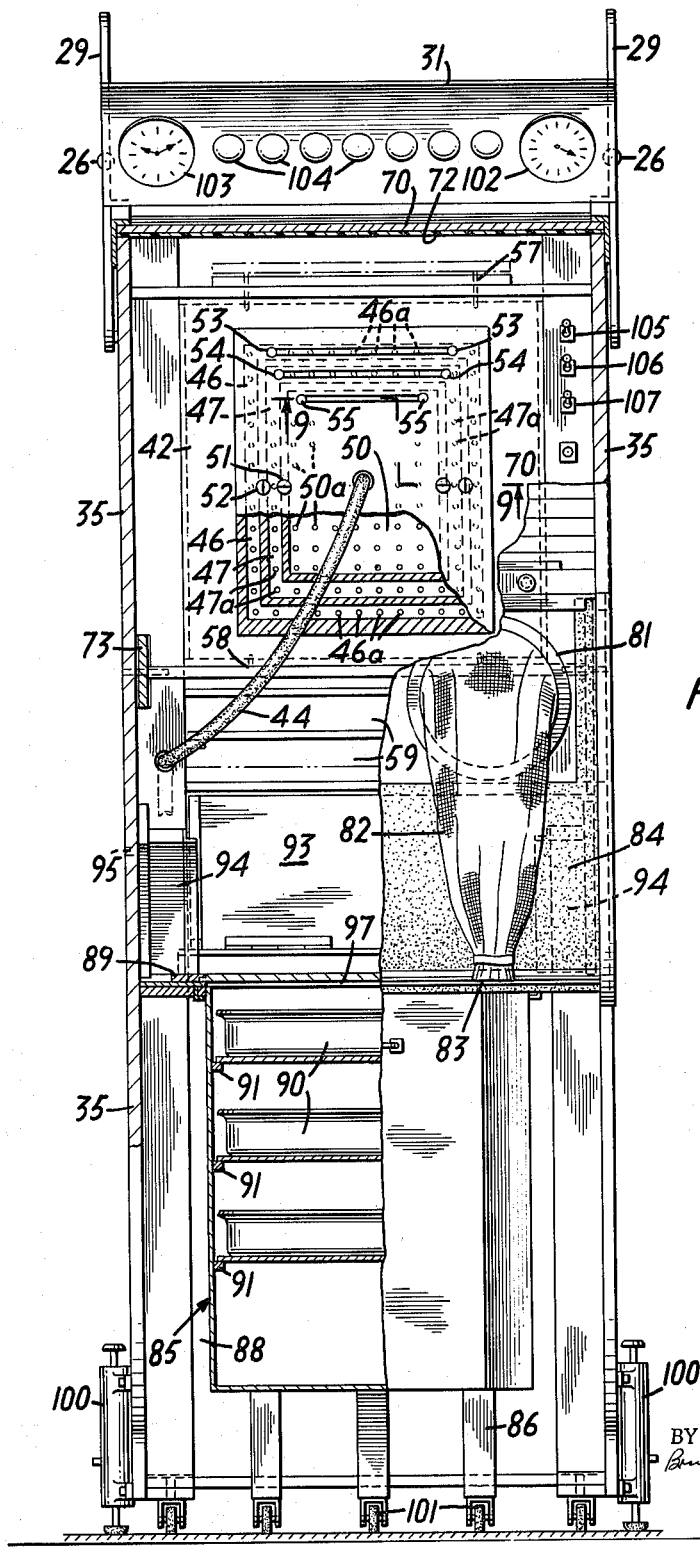
FIGURE 5 shows a partially cross-sectioned end elevation of the exposure and development sections of the invention.

As shown in FIGS. 3 and 4, a holding plate 42 forms the removable rear wall of the chamber 38 and is held in this position by pins 57 and 58. Light sensitive material 43 is held in direct alignment with the lens 40 by means of register pins and held firmly in place by suction introduced through a plurality of apertures in the holding plate 42. In particular, a motor 45 creates a vacuum in the tank and flexible line 44 which is connected to a central tube 49 on the back surface of the plate 42. As shown in FIG. 5, the tube communicates through a main chamber 50 to a series of two channels 46 and 47 each defining a rectangular path within the plate 42, the path of the outer channel 46 totally encompassing the path of the inner channel 47 and both channels surrounding chamber 50. This inner chamber 50 has a plurality of apertures 50a positioned equidistantly and opening onto the front surface of plate 42. Similarly the next largest channel 47 and the largest rectangular channel 46 both have a series of openings 47a and 46a, respectively, on the front surface of the plate 42.

Thus, the smallest piece of light sensitive material 43 is held in place adjacent the holding plate 42 by a vacuum acting through chamber 50. In this case the outer channels 47 and 46 blocked by valve pins 52 which close the opening connecting channel 47 with chamber 50. On the other hand, as shown in FIG. 9, a medium size sheet of light sensitive material may be held in place by a vacuum acting through both the apertures in chamber 50 and channel 47. In this second case valve pin 51 blocks the opening between channel 47 and the outer channel 46. Finally when the largest size of light sensitive material is desired, both pins 51 and 52 are turned open and the light sensitive material 43 is held in place by a vacuum acting through all three enclosed areas, channels 46, 47 and chamber 50.

Each of pins 51 and 52 is rotatable in its position and has an aperture 48 passing through the center of its stem. It is the positioning of these apertures between adjacent chamber and channel areas that controls the surface area of the holding plate exposed to a vacuum.

To facilitate the photographer in placing the light sensitive material against the holding plate by using his sense of touch, a series of register pins 53, 54 and 55 may be used. Each set of register pins is designed to protrude beyond the front surface of plate 42 when in use and to remain withdrawn beneath this surface when not in use as shown in detail in FIG. 9. The register pins are all biased by resilient means 65 thereby insuring that the pins will remain fixed in the position chosen by the photographer whether protruding or withdrawn. As can be seen in FIG. 5, holes in the two upper corners of the largest piece of light sensitive material may be placed adjacent pins 53. Similarly the holes in the upper corners of the medium-sized light sensitive material may be placed adjacent pins 54 and the holes in the corners of the small-sized piece adjacent pins 55. Naturally the sleeves 66 which pass through vacuum chamber 50 and vacuum channels 46 and 47 must maintain a tight sealing relationship with the walls of the holding plate 42.

The motor 45, the tank 45a and the valve connection 45b form a removable unit which may be positioned away from the entire photographic apparatus when it occupies a fixed position and an exposure is being made. This arrangement insures that the vibrations of the motor 45 will not be transmitted to the light sensitive material and will not cause a blurring of the image being reproduced. The lower portion of the flexible tubing is long enough to permit the removal of this unit. Also the unit is provided with wheels 45c which permit it to be dragged along when the entire apparatus is moved without requiring the photographer to replace the unit back onto the photographic apparatus frame.

Short exposures may, however, be made with the motor unit attached to the frame. In this case the motor 45 is merely turned off just prior to exposure. Due to the closing of one-way valve 45b a vacuum, which is capable of holding the light sensitive material in place for a limited period of time, is maintained in both tubing 44 and chamber 50.

The support brackets 29, which are attached to the side walls 35, support a display board 31 which contains a clock 103, a timer 102 and a plurality of signals 104 as shown in FIG. 5. Each of these signals indicates that a certain element in the apparatus is energized, such as the vacuum pump motor 45, the rear tungsten focusing lamp 28 or the front tungsten focusing lamps 117. When each of these elements is on, its related signal light 104 will also be on. The other signalling elements include connections to a back flash, a front flash and an overhead flash which are not shown in the drawings but which may be readily connected to, and used in cooperation with, the disclosed photographic apparatus. Switches 105, 106 and 107, shown on the right side of the panel as viewed in FIG. 5, control the timing clock 102, the focusing motor 20 and the vacuum motor 45, respectively.

The development section 13, shown best in FIGS. 3, 4 and 5, consists primarily of a light-tight chamber 96 having means within the chamber for positioning light sensitive material adjacent the holding plate 42 and a light-tight lower chamber formed with movable cart 85 for containing baths of development fluid. The chamber 96 itself is formed by side walls 35, front wall 36 and flexible sliding upper cover 70 which will be closed during development and placement work but which may be rolled up within its upper container 71 when access to the chamber 41 is desired. This opening in chamber 96 is necessary to permit focusing, flashing and cleaning. Normally, during the focusing operation the photographer will open cover 70, position the holding plate 42 in its storage position in one of shelves 59 within chamber 96 or on brackets 94 and focus the desired image on a glass plate 56 positioned at the exact location which the light sensitive material will later occupy on the holding plate 42. The glass plate 56 may be positioned in the same manner as the holding plate, as described hereinafter. When the image is satisfactory the photographer merely removes the glass plate, placing it in its storage position in one of the shelves 59, closes sliding cover 70, loads the holding plate with light sensitive material in its lower position on supporting brackets 94, as shown in FIG. 6 and described hereinafter, moves it to its upper position and proceeds to expose and develop a negative or print.

The cover 70 must be flexible in order to permit the free movement of the photographer's arms within the chamber. For instance, the cover must be capable of extending to a much lower position as shown in FIG. 3 when the photographer is seated than when he is standing as shown in FIG. 4. It is this flexibility of cover 70 which allows the photographer to reach both the upper pin 57 locking the holding plate 42 and at the same time reach lower development baths 90.

The cover 70 itself is formed of a plurality of interlocking pieces held in place by a thin strip of plastic covering 72 which yields to form the necessary configuration for any specific position.

Attached to the flexible cover 70 by a fastener 78 is a protruding light-sealing cover 75 which extends toward the photographer when he is working with the apparatus. Two arms 73 are pivoted at points 74 on the sides of the chamber 96. The slidable cover 75 is held in a tight light-sealing relationship against the upper surface of the arms 73 by rods 76 which are pivoted at points 77. The other ends of these rods are also attached to the fastener 78 which holds the sliding cover 70 in its closed position.

The slidable cover 75 and the pivoted rods 76 force the flexible cover 70 away from the photographer when he moves his arms downwardly. If the cover 70 did not move away, it would be necessary for the photographer to work with his face flush against the flexible cover when he is seated. Finally, the transverse movement of the slidable cover 75 reduces the rolling and unrolling of the flexible cover 70 by reducing the area which it must occupy.

Between the arms 73 on the rear surface of the chamber 96 are two large apertures 81 (FIG. 5) which have long pieces of light impervious material attached firmly about their rims. This material is formed in the shape of a sleeve 82 with a tight elastic wrist binding portion 83. As shown in FIGS. 3, 4 and 5, the sleeves 82 are hanging outwardly in an unused position. When in use, however, these sleeves would be inverted and placed around the arm of the photographer forming a tight seal about his wrist as shown in phantom in FIGS. 3 and 4. A lower expandable surface 84 permits the operator to work in the seated or standing position.

The chamber 96 is bounded on its lower surface by platform 89 which has an aperture covered by a sliding door 97. The side walls 35 extend below the chamber 96 and join with the lower forward wall 16 to form a recess 88 for receiving a movable cart 85 as shown in FIG. 5. Recesses 87 in the side walls 35 accommodate the knees and lower legs of the photographer when he is operating in a seated position. Also the lower surfaces of the side walls 35 have a plurality of small wheels which give mobility to the entire photographic apparatus 10. Foot stops 100, on the other hand, provide stability at any desired location.

The movable cart 85 is specifically designed to enter recess 88 and form a tight light-sealing relationship with the lower platform 89. The sliding door 97 in platform 89 gives the photographer access to the cart and the processing baths contained therein when they are needed. However, when replacement of the processing material is necessary, the sliding door 97 may be closed and the cart 85 wheeled away without exposing the chamber 96 to light. The cart itself has a plurality of tracks 91 each of which supports a movable platform and a processing bath 90. When the photographer desires to use a lower bath he merely rolls the upper bath or baths along tracks 91 to a non-blocking position in the front of cart 85. It is intended that these movable platforms support various trays, tanks and photographic supplies as more improved photographic techniques are developed in the future.

Figure 3A:
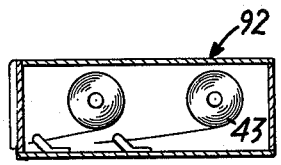
FIGURE 3A illustrates a cross-sectional elevation of an alternative embodiment for the container holding light sensitive material.

Positioned adjacent the chamber 96 and below the exposure section 12 is a light-tight storage chamber 92 (FIG. 3) which contains various sizes of light sensitive material 43. This material 43 may be cut to predetermined sizes as shown in the preferred embodiment in FIG. 3, or may be supplied on a roll or rolls with means for cutting it as shown in FIG. 3A. A hinged door 93 permits the photographer to gain access to the storage area 92 when chamber 96 is sealed and it is this door 93 which protects the material 43 when chamber 96 is exposed to light during focusing.

The two supporting brackets 94, pivoted to the interior walls 35 by fasteners 95, are provided with lips 98 for supporting the holding plate 42 when it is being loaded and unloaded with light sensitive film. With the holding plate laying between the brackets 94, the photographer may easily and quickly remove the light sensitive material 43 from the storage area 92, position it properly adjacent the apertured surface of the holding plate, and secure it in place starting the vacuum pump 45. The entire plate may then be moved to its upper position between the pins 57 and 58 and locked in place at that point prior to exposure. Since the tube 44 is flexible and has sufficient length, it may be readily moved between the lower loading position on the support brackets 94 and its upper position.

The transfer of plate 42 is further facilitated by the fact that the edges of the brackets 94 are aligned with edges of an aperture 36a in the upper front wall 36, as shown in FIG. 6, which edges define the plate's upper position. Thus, one end of the holding plate 42 may enter the aperture 36a while the other end of the plate remains in the brackets 94 adjusting its transverse position. This alignment greatly assists the photographer since during this time he is working only through the sense of touch.

Finally, during the developing process after the light sensitive material has been exposed and unloaded from the plate 42, it will be necessary to remove the holding plate from its lower position on the brackets 94 and place it in one of the shelves 59 in order to provide the photographer with access to the sliding door 97 and the lower processing baths. If a second exposure of the same subject is desired, the plate 42 may be unloaded and reloaded at one time and then replaced in its upper position. However, if it will be necessary to refocus, the holding plate 42 may be unloaded and stored in one of the unused shelves 59 until reloading for the next exposure is again possible.

FIG. 7 portrays equipment useful for reproducing photographs from reflection copy material. A backing wall 113 for holding the copy is positioned on the front surface of the display container 22 and may thus be moved along a table 14 by energizing electric motor 20. In this embodiment the vertical rods 24 support the brackets 114, each of which supports one of the lamp rods 115 and 116. These lamp rods both have lamps 117 at the forward ends of the rods positioned well ahead of the subject backing wall 113 and also placed to the side to insure that the angle of incidence is controlled.

A central lamp support rod 120, fastened to the upper surface of the display container 22 by the fastening element 33, has a movable supporting device 119 positioned along its length. The supporting element 119 is composed of three brackets 125, 126 and 127 which are firmly joined together by fastener 118 and all of which have apertured end flanges. The apertures 128 in the bracket 126 are designed to receive the supporting rod 120, while bracket 127, which is pivotally fastened within and below bracket 126, is provided with apertures 130 for receiving the right lamp support rod 115. The apertures 130 are higher than the apertures 128, thereby assuring clearance between the central rod 120 and lower right lamp rod 115. Bracket 125 is fastened above bracket 126 and has apertures 129 for receiving upper left lamp support rod 116.

In the embodiment in FIG. 7 the lamp support rods are positioned manually although automatic means for moving bracket 126 along support rod 120 may be used. It is to be observed that movement of the bracket 126 causes rotation of the pivotally mounted brackets 125 and 127 and thereby changes the angle of illumination of the lamps 117 on wall 113. Thus, in using either the manual or automatic version, the adjustable supporting device 119 greatly facilitates and increases the speed at which light corrections may be made by the photographer.

The present invention presents an apparatus for reproducing and processing photographic transparencies, negative and positive, live and relief subjects, which apparatus may be operated by the photographer at one specific position and in an area where it would be otherwise impossible to remove all light. With this apparatus the photographer may now photograph his subject and immediately develop the light sensitive material in that one position. The inventive apparatus has application in areas where space is at a premium and where it would not be possible to provide or have access to a dark room. In addition, this apparatus provides means for greatly improving the speed of processing photographic material and permits the subject to see the photographic results while he waits. This improvement in speed is a result of the particular arrangements and structural design of the apparatus disclosed in this invention.

The exposure section 12 and the development section 13 may be separated as a unit from the display section 11 by releasing fasteners 63 which join the table 14 with the side walls 35, and by releasing fasteners 64 joining overhead rods 26 to brackets 29. The separated exposure and development unit is shown in FIG. 4 and may be easily rolled on wheels 101 to any desired location. The handles 69 shown in a folded position in FIG. 1, give the photographer a means with which to direct the movement of this unit.

As shown in FIG. 4, the separated exposure-development unit may be used in conjunction with a prism 61 which can direct side, upper or lower images into the lens. FIG. 4 shows a positive subject 62 positioned on a lower platform 60 being photographed through the prism 61.

Furthermore, since the temperature of the development baths and the processing chamber can often be a critical factor, this invention provides an optional temperature control unit 68 which may be fastened to walls 16 and 35 and attached to a baffle 67 as shown in FIG. 4. The baffle engages movable cart 85 when the cart is placed in recess 88 and is designed to maintain a light-tight enclosure with the cart itself.

Modern flashing and printing processes commonly used in the photographic industry can also be readily used with this apparatus. The photographer can merely open cover 70 and use the holding plate 42 either in its lower position or reversed in its upper position as a means for fastening the printing and flashing materials in place. With cover 70 open, light sources necessary for use in these processes can be positioned above or to the rear of the exposed holding plate. Thus, the apparatus disclosed in this invention is also designed to facilitate the use of many modern photographic techniques.

Although the invention has been described with a certain degree of particularity, it is to be understood that the present disclosure has been made only by way of example and that numerous changes in the details of construction and the combination and arrangement of parts may be resorted to without departing from the spirit and scope of the invention as hereafter claimed.

I claim:
1. Photographic apparatus comprising,
a holder for light sensitive material,
means to provide images on the light sensitive material,
a light tight enclosure behind the holder for photographic processing of the light sensitive material positioned in the holder,
a pair of arm openings through the enclosure enabling access to the holder,
flexible light sealing means associated with the pair of arm openings,
a movable holder of photographic supplies positioned in the lower section of the enclosure and accessible through the arm openings, whereby the light sensitive material exposed in the holder may be removed from the holder and immediately processed in the light tight enclosure, and
means to open the upper section of the enclosure to provide free access to the interior of the enclosure and the holder including a flexible sheet-like cover that may be drawn down over the upper section of the enclosure, a member through which the arm openings extend, and means for mounting the member to enable it to be raised and lowered and thereby raise and lower the arm openings.

2. Photographic apparatus as defined in claim 1, wherein the opening means further comprises a rigid slidable cover mounted in a light-tight relationship above the member having arm openings and attached to the end of the flexible sheet-like cover when it is in closed position, whereby the rigid slidable cover and the flexible cover move away from the arm openings when the arm openings are lowered, at the same time maintaining the light-tight condition with the photographic processing chamber.

3. Photographic apparatus comprising,
a holder for light sensitive material,
means to provide images on the light sensitive material,
a light tight enclosure behind the holder for photographic processing of the light sensitive material positioned in the holder,
a pair of arm openings through the enclosure enabling access to the holder,
flexible light sealing means associated with the pair of arm openings, and
a movable holder of photographic supplies positioned in the lower section of the enclosure and accessible through the arm openings, whereby the light sensitive material exposed in the holder may be removed from the holder and immediately processed in the light tight enclosure, said movable holder including a container having side walls and an access port on its upper surface movable into a light tight relationship below the light tight enclosure, including a plurality of tracks adjacent the inner surface of the side walls of the container, and including a plurality of individual platforms for supporting photographic supplies, each platform mounted upon a pair of tracks, one pair above the other, and each platform movable between a blocking position preventing access to a lower platform and a non-blocking position permitting such access, whereby access to the supplies on the lower platforms is provided by moving the upper platforms and supplies along their tracks to the non-blocking position.

4. Photographic apparatus comprising,
a holder for light sensitive material,
means to provide images on the light sensitive material,
a light tight enclosure behind the holder for photographic processing of the light sensitive material positioned in the holder,
a pair of arm openings through the enclosure enabling access to the holder,
flexible light sealing means associated with the pair of arm openings, and a movable holder of photographic supplies positioned in the lower section of the enclosure and accessible through the arm openings, whereby the light sensitive material exposed in the holder may be removed from the holder and immediately processed in the light tight enclosure, said movable holder including a cart mounted on wheels having a recess in its upper surface and having opposite side walls, the recessed upper surface being movable adjacent the lower surface of the light tight enclosure to form a light tight development chamber, including a plurality of parallel rails attached to the opposite side walls within the light tight development chamber, including a plurality of platforms for holding photographic supplies positioned one above the other within the development chamber, each platform being slidable along a pair of parallel rails each of which is mounted upon an opposite side wall, whereby access is provided to the supplies on any platform by sliding all higher platforms away from a position directly above the platform supporting the supplies desired.

5. Photographic apparatus comprising,
a light tight enclosure for photographic processing of light sensitive material,
a holder for light sensitive material movable between positions within the light tight enclosure,
flexible vacuum means for fastening the light sensitive material in a position adjacent the holder,
means to provide images on the light sensitive material,
a pair of arm openings through the enclosure enabling access to the holder,
flexible light sealing means associated with the pair of arm openings, and
a movable holder of photographic supplies positioned in the lower section of the enclosure and accessible through the arm openings, whereby the light sensitive material exposed in the holder may be removed from the holder and immediately processed in the light tight enclosure, wherein the vacuum means comprise
a portable frame removably attached to the exterior of the light-tight enclosure,
a suction pump mounted on the frame,
a vacuum tank connected to the pump and mounted on the frame, and
a flexible tube connecting the holder with the vacuum tank whereby the pump, the tank and the portable frame may be removed from the exterior of the light-tight enclosure during exposure of the light sensitive material.

References Cited by the Examiner
UNITED STATES PATENTS

| | | | |
|---|---|---|---|
| 870,751 | 11/07 | Welsh. | |
| 2,319,882 | 5/43 | Reagan et al. | 88—24 |
| 2,474,055 | 6/49 | Lacey | 88—24 |
| 2,694,337 | 11/54 | Anander | 88—24 |
| 2,717,756 | 9/55 | Keeshan et al. | 88—24 |
| 3,040,640 | 6/62 | Abel et al. | 95—91 |
| 3,146,690 | 9/64 | Hoffman | 88—24 |

NORTON ANSHER, *Primary Examiner.*
WILLIAM MISIEK, *Examiner.*